Oct. 4, 1932.  J. E. BOWER  1,880,748
HYDRAULICALLY OPERATED CLUTCH
Filed May 28, 1930
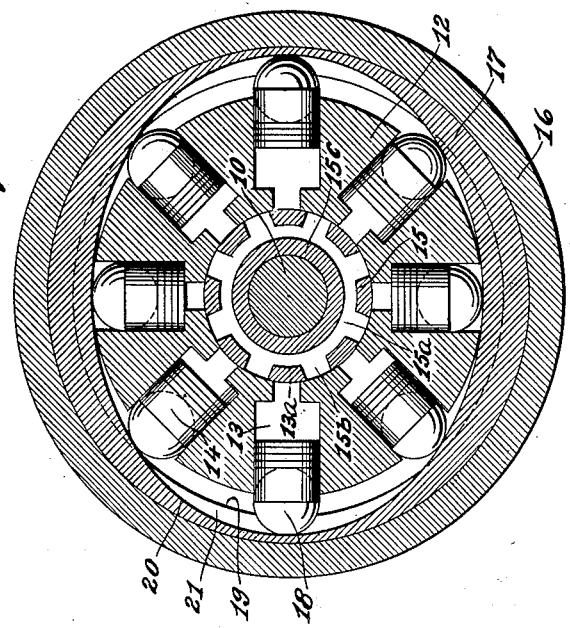
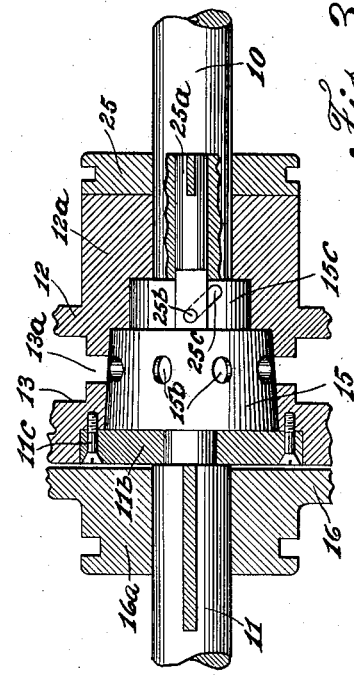
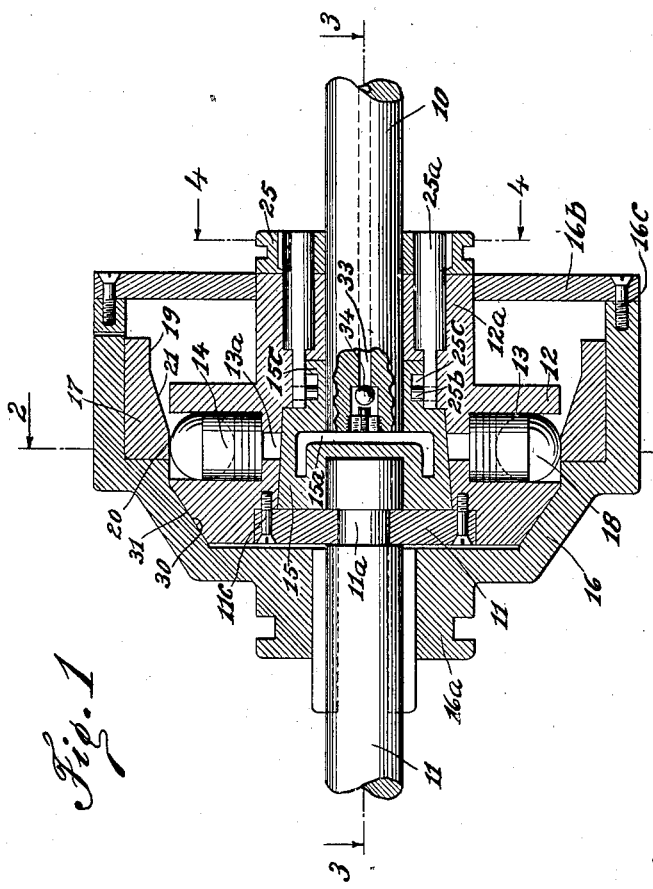
INVENTOR.
JOSEPH E. BOWER,
BY
W. H. Woodard
ATTORNEY.

Patented Oct. 4, 1932

1,880,748

UNITED STATES PATENT OFFICE

JOSEPH E. BOWER, OF MILWAUKEE, WISCONSIN

HYDRAULICALLY OPERATED CLUTCH

Application filed May 28, 1930. Serial No. 456,491.

This invention relates to a hydraulically operated clutch for use in power transmission mechanism.

One object of the present invention is the provision of an improved hydraulically operated clutch mechanism for connecting the driving shaft of a power plant with the driven shaft of a vehicle or other working assembly of a machine.

Another object of the invention is a provision of an improved transmission mechanism, such as described, for controlling relative rotation between a driving and driven shaft, whereby various speed ratios between the two shafts may be readily obtained.

Other objects and advantages will later appear.

The invention is illustrated in the accompanying drawing, in which:

Figure 1 is a longitudinal central sectional view of a transmission mechanism constructed in accordance with the present invention.

Figure 2 is a transverse sectional view taken substantially on the line 2—2 of Figure 1.

Figure 3 is a fragmentary sectional view taken on the axial line 3—3 of Figure 1, showing oscillating valve in full lines, and in its relation to the shaft or rod by which it is operated.

Figure 4 is a transverse sectional view taken on the line 4—4 of Figure 1.

For convenience of illustration and explanation, the invention is shown and will be described as embodied in power transmission mechanism, designed for use in motor vehicles, although it is applicable for use in various other relations, as will be understood.

The hydraulic power transmission mechanism illustrated is employed for controlling relative rotation between the two shafts, which for the sake of convenience and clearness, will be hereinafter referred to as the driving shaft 10 and the driven shaft 11 respectively. Either may be used as the driving shaft, however, and the other is the driven shaft.

The driving shaft 10 carries a circular body member 12, provided with a hub 12a at one side, and keyed or otherwise fixed upon the driving shaft 10. When the invention is used as a part of a motor vehicle equipment, the body member 12 will serve as a fly wheel. The body member 12 is bored from its periphery, and is provided with eight cylinders 13, extending radially to the axis of rotation, and evenly spaced in the circumference thereof. Each cylinder 13 contains a piston 14, which has reciprocating movement in the cylinder. The bottom of each cylinder is counter-bored as at 13a, to provide an inlet to the cylinder, as will hereinafter be described.

At its other side, the body member 12 is provided with a succession of bores for the reception of a valve member 15, of circular form, and provided interiorly with a distributing valve chamber 15a, from which open outwardly eight passages or ports 15b, equally spaced about the periphery of the valve member, and adapted to be brought into registry with the inlets 13a of the cylinders 13. The valve member 15 is provided at its inner end with a tubular extension 15c, which encircles the driving shaft 10, and is entered in the smaller part of the bore in the side of the body member 12. The periphery of the valve member 15 preferably is tapered to fit the tapered part of the bore in the body member 12. The outer face of the valve member 15 is bored for the reception of the end of the driven shaft 11, the end of which runs freely in the said bore. The end of the driven shaft 11 is provided with a circumferential groove 11a, in which is received the opposite cut-out portions of a split plate 11b, the parts of the split plate being fitted in a larger opening in the outer face of the body member 12, and secured therein by screws 11c, passed through the plate 11b, and entered into threaded openings in the body member 12. By this means, the driving shaft 10 and the driven shaft 11 are coupled together in axial alignment, so that they may rotate independently, but will rotate together when clutched.

A hollow casing member 16 having a hub 16a, embraces the body member 12, just described, and the parts associated therewith, the end closure being completed by the plate 16b, bored centrally to receive the hub of the body member 12, and secured in position to close the casing member by screws 16c. The hub 16a of the casing member 16, is splined upon the driven shaft 11, so that the said casing member may be moved longitudinally with respect to the driven shaft 11, and into and out of engagement with the clutch members of the body member 12, as will be hereinafter described.

A hardened ring 17 is secured within the casing member 16 in position to form a lining for the said casing. The ring 17 is provided on its inner face with three tracks 19, 20 and 21. The surfaces of the tracks 19 and 20 are parallel with the common axis of the shafts 10 and 11, although the track 19 is concentric and the track 20 is elliptical. Track 21 is a sloping track, between and blending into tracks 19 and 20, so that there is a gradual transition of the track 19 into the track 20, at all points, and vice versa.

A circumferential groove in the hub 16a of the casing member, is adapted to receive a clutch shifting lever by means of which the casing member may be shifted longitudinally on the driven shaft 11, and with respect to the body member 12 and the parts associated therewith. A collar 25 is mounted loosely on the driving shaft 10, adjacent the end of the hub 12a of the body member. Fixed in the said collar are opposite shafts or rods 25a, which are adapted to slide in corresponding openings in the hub 12a. At their inner ends, the said rods carry pins 25b, which work in inclined slots 25c in the tubular extension 15c of the valve. The collar 25 is provided with a circumferential groove in which is entered a clutch shifting lever, through the action of which the collar may be moved longitudinally with respect to the driving shaft 10, and a movement of partial rotation be given the valve member 15 to bring its ports 15b into or out of registration with the inlets 13a of the cylinders.

The distributing valve chamber 15a is supplied with oil or other liquid through an oil line 33 arranged centrally of the driving shaft 10, and supplied by the usual force feed oiling system of the motor. A check valve 34 in the said oil line, prevents back flow. The pistons 14 support at their outer ends, members 18 for contacting with the tracks of the ring 17, such contact members being shown as balls; but other forms of suitable contact members may be used.

When the casing member 16 has been moved away from the body member 12, the balls 18 will rotate freely over the concentric track 19 of the ring 17, and there will be no rotation of the driven shaft 11. When the casing member 16 has been shifted oppositely along the driven shaft 11, the balls 18 will pass transversely of the sloping track 21, and onto the elliptical track 20 of the ring 17. At such time the valve member 15 will be partially rotated so as to fill the cylinders 13 with oil or other liquid, and the balls 18 will be engaged with the track 20, and held in that position by closing the valve 15. On account of the different radii of the points of engagement between the clutching surfaces of the body member 12 and the casing member 16, the rotation of the driving shaft 10 will be transmitted to the driven shaft 11, because of the resistance to compression existing in the cylinders to which the longer radii appertains.

When the driving shaft 10 and the driven shaft 11 are thus engaged for rotation at a maximum speed, the strain upon the connection between the parts may be lessened by the employment of a direct clutch between the body member 12 and the casing member 16. In the present instance, I have shown the body member 12 as provided with a conical face 30, for engagement with a correspondingly formed face in the casing member 16, there being a frictional engagement when the casing member 16 is moved axially into engagement with the body member 12.

The speed of the driven shaft 11, with relation to that of the driving shaft 10, may be varied by controlling the amount of oil or other liquid that is permitted to transfer between the cross cylinders, and this control can be determined by an exact regulation of the movement of the valve member 15, so as to vary the dimensions of the passage from the valve chamber 15a, through the ports and inlets, to the cylinders.

The overall length of each of the tracks 19, 20 and 21, of the ring 17, is the same, notwithstanding their varying contours.

Having thus described my invention, what I claim and desire to secure by Letters Patent of the United States, is:

1. In a device of the character described, the combination of a driving shaft, an aligned shaft driven therefrom, a body member fixed upon one of said shafts, a hollow casing splined for axial movement on the other of said shafts, and enclosing the said body member, the body member being provided with a plurality of spaced cylinders extending radially to the axis of rotation thereof, a ring within the said casing having an elliptical track, a concentric track, and a third track intermediate the other two and substantially blending into such other two tracks, a piston carried by and movable in each of said cylinders and supporting a member adapted to contact with either of said tracks, a valve centrally arranged in the said body member and containing a valve chamber in communication with the said cylinders, means for opening and closing the said valve to control the passage of liquid to the cylinders, and means for axially moving the said casing with respect to the body member, to effect coupling of the shafts.

2. In a device of the character described, the combination of a driving shaft, an aligned shaft driven therefrom, a body member fixed upon one of said shafts, a hollow casing splined for axial movement on the other of said shafts, and enclosing the said body member, the body member being provided with a plurality of spaced cylinders extending radially to the axis of rotation thereof, a ring within the said casing having an elliptical track, a concentric track, and a third track intermediate the other two, and substantially blending into such other two tracks, a piston carried by and movable in each of said cylinders and supporting a member adapted to contact with either of said tracks, a rotating valve centrally arranged in the said body member and containing a valve chamber in communication with the said cylinders, means for opening and closing the said valve to control the passage of liquid from the valve chamber to the cylinders, and means for axially moving the said casing with respect to the body member to effect coupling of the shafts.

3. In a device of the character described, the combination of a driving shaft, an aligned shaft driven therefrom, a body member fixed upon the driving shaft, a hollow casing splined for axial movement on the driven shaft, and enclosing the said body member, the body member being provided with a plurality of spaced cylinders extending radially to the axis of rotation thereof, a ring within the said casing having an elliptical track, a concentric track, and a third track intermediate the other two, and substantially blending into such other two tracks, a piston carried by and movable in each of said cylinders and supporting a member adapted to contact with either of said tracks, a valve centrally arranged in the said body member and containing a valve chamber in communication with the said cylinders, means for opening and closing said valve to control the passage of liquid from the valve chamber to the cylinders, and means for axially moving the said casing with respect to the body member to effect coupling of the shafts.

4. In a device of the character described, the combination of a driving shaft, an aligned shaft driven therefrom, a body member fixed upon the driving shaft, a hollow casing splined for axial movement on the driven shaft, and enclosing the said body member, the body member being provided with a plurality of spaced cylinders extending radially to the axis of rotation thereof and each having an inlet at its inner end, a ring within the said casing having an elliptical track, a concentric track, and a third track intermediate the other two, and substantially blending into such other two tracks, a piston carried by and movable in each of said cylinders and supporting a member adapted to contact with either of said tracks, a valve centrally arranged in the said body member and containing a valve chamber with ports registering with the inlets of the said cylinders, means for opening and closing the said valve to control the passage of liquid to the cylinders, and means for axially moving the said casing with respect to the body member to effect coupling of the shafts.

In testimony whereof, I have signed my name at Milwaukee, this 30th day of June, 1931.

JOSEPH E. BOWER.